July 2, 1929.　　　　J. W. SMITH　　　　1,718,987
RECIPROCATING TOOL HOLDER OF METAL WORKING MACHINES
Filed May 28, 1925
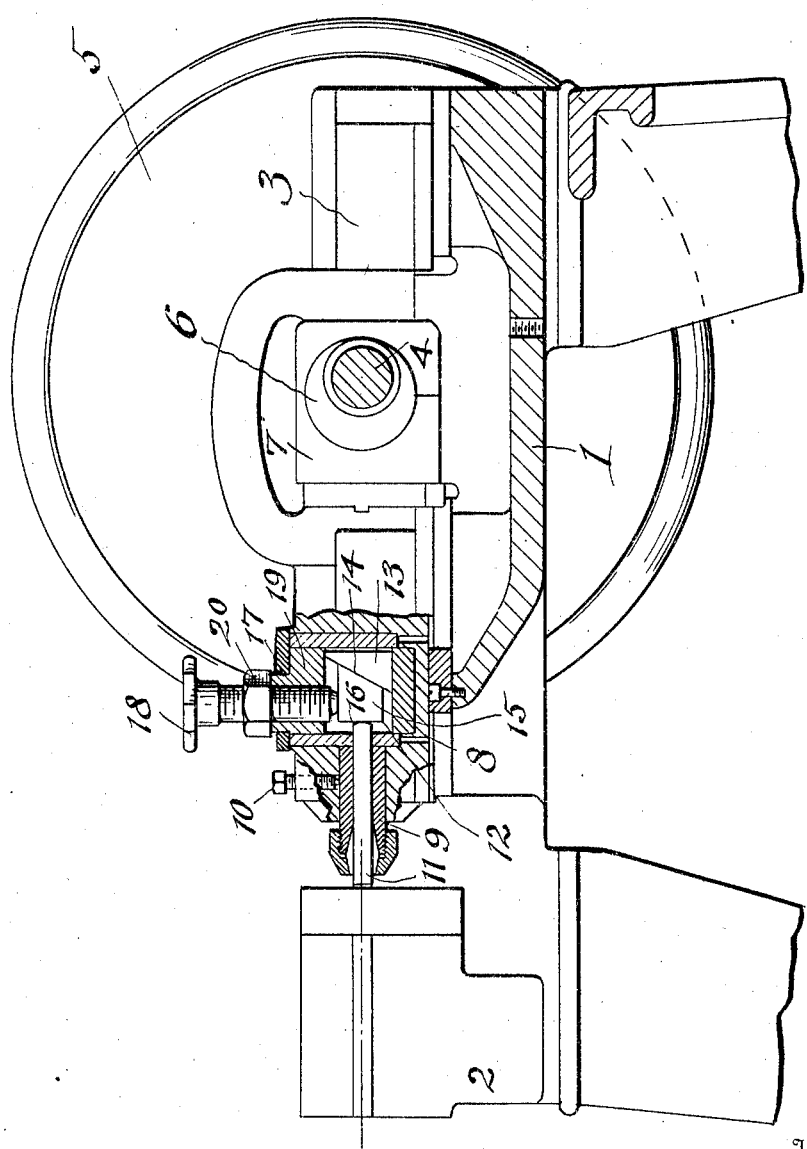
Inventor
*James W. Smith*
By *Kwis Hudson & Kent*
Attorney Patented July 2, 1929.

1,718,987

UNITED STATES PATENT OFFICE.

JAMES W. SMITH, OF BALTIMORE, MARYLAND, ASSIGNOR TO THE LAMSON & SESSIONS COMPANY, OF CLEVELAND, OHIO, A CORPORATION OF OHIO.

RECIPROCATING TOOL HOLDER OF METAL-WORKING MACHINES.

Application filed May 28, 1925. Serial No. 33,366.

This invention relates to metal working machines and more particularly to tool holders of the type reciprocated by an eccentric from a driver shaft.

In machines in which a reciprocating head or slide carrying a tool such as a punch or heading die is operated by an eccentric on a driving shaft and co-operates with the work holder which supports the work in position to be engaged by the tool, it sometimes happens that, due to imperfect operation of the work handling mechanism or for other reasons, the work is not properly positioned with respect to the tool and the movement of the tool near the end of a stroke is so impeded that the driving mechanism becomes stalled, with the result that the movement of the head is stopped with the tool jammed against the work. The eccentric in such cases is usually at, or very close to, dead center and a great deal of force is required to shift the eccentric from its dead center position to free the tool from the work. It has heretofore been the usual practice for the operator to insert a crow-bar between the spokes of the driving pulley on the eccentric shaft and to pry against the part of the machine frame in order to rotate the shaft sufficiently to free the tool. Serious damage is often done to the bearings and other parts of the machine by the severe stresses to which they are thus subjected.

It is the object of the present invention to provide a mounting for the tool by which the tool is rigidly held, but which will permit the tool to be released so that endwise movement may be permitted between the tool and its holder, whereby the shaft may be easily rotated past dead center to retract the tool holder.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings, forming a part of this specification, in which there is shown a sectional elevation of a metal working machine embodying the invention, the tool holder part being shown in longitudinal section.

Referring to the accompanying drawings, the metal working machine as herein shown comprises a bed 1 having a suitable work holder 2 at one end thereof and a tool holder slide 3 mounted in suitable guides in the bed for movement toward and from the work holder, the slide 3 being reciprocated upon the bed 1 by a driving shaft 4 provided with a driving pulley 5 and an eccentric 6 rotating in a vertically movable block 7 carried by the slide 3. The slide 3 has a tool holding portion 8 at the forward end thereof which is adapted to receive a tool holding chuck 9 which is held in place by the set screw 10 and supports a suitable tool 11 which projects beyond the forward end thereof to engage with the work carried by the holder 2.

The tool 11 extends lengthwise of the slide 3 and projects beyond the rear end of the chuck 9 into a chamber 12 formed in the slide 3 rearwardly of the chuck receiving portion. Within the chamber 12 there is mounted an abutment block 13 which has an inclined face 14 on the outer side thereof. The block 13 is positioned directly in line with the tool 11 and interposed between the block 13 and the tool 11 there is a vertically movable wedge 15, which has an inclined inner face in slidable engagement with the inclined face 14 of the block 13 and an outer face 12, against which the inner end of the tool 11 bears, which is at right angles to the axis of the tool. The upper and larger end of the wedge 15 is engaged by the lower end of a screw 17 which is provided with a hand wheel 18 at its upper end and is threaded through a plug 19 which closes the top of the chamber 12. The inclination of the outer face 14 of the block 13 is such that pressure transmitted endwise through the tool 11 will slide the wedge 15 upwardly along the block. This movement, however, is ordinarily restrained by the screw 17 which is set to hold the wedge 15 in proper adjusted position with respect to the tool, the screw 17 being provided with a lock nut 20 for retaining it is adjusted position.

Whenever in the operation of the machine the tool becomes jammed against the work, preventing the completion of the stroke of the slide and locking the driving mechanism with the eccentric in or near dead center position, the tool may easily be freed from the work by adjusting the screw 17 upwardly to release the wedge 15, which will permit sufficient relative movement between the tool 11 and the slide 3, to enable the shaft 4 and eccentric 6 to turn past dead center position and retract the slide.

Having thus described my invention, what I claim is:

1. In a device of the character described, a work support, a tool carrying member movable toward and from the support, a drive shaft having an eccentric for reciprocating said member, a tool carried by said member, said tool extending lengthwise of said member, a transversely disposed thrust receiving wedge interposed between said tool and member, said wedge having a taper such that it may be shifted by the end thrust of the tool thereon, and means for releasably holding said wedge in place.

2. In a device of the character described, a work support, a tool carrying member movable toward and from the support, a drive shaft having an eccentric for reciprocating said member, a tool carried by said member and extending longitudinally thereof, a fixed abutment block carried by said member and having a face inclined at an obtuse angle to the axis of the tool, a wedge having an inner inclined face engaging the block and a face at right angles to the axis of the tool against which the tool engages, the engaging faces of the wedge and block being disposed at an angle such that the wedge may be moved by the end thrust of the tool thereon, and adjustable means for holding said wedge in adjusted position.

3. In a device of the character described, a work support, a tool carrying member movable toward and from the support, a drive shaft having an eccentric for reciprocating said member, a tool carried by said member and extending longitudinally thereof, an abutment block fixed to said member and having an inclined face, a wedge interposed between said block and tool, said wedge having a sliding engagement with the inclined face of said block, the inclination of the face of the block with respect to the axis of the tool being such that the wedge may be moved by end thrust on the tool, and adjustable positioning means engageable with the large end of the wedge to releasably hold the same in an adjusted position.

4. In a device of the character described, a work support, a tool carrying member movable toward and from the support, a drive shaft having an eccentric acting on said member to reciprocate the same in an endwise direction, a tool carried by said member and extending lengthwise thereof, an abutment block fixed to said member, said block having an inclined face toward said tool, and a transversely movable wedge interposed between said block and the inner end of said tool, said wedge having an inclined inner face slidable upon the inclined face of the block and an outer face against which the inner end of the tool bears, the inclination of the inner face being such that the wedge may be moved by the end thrust of the tool thereon, said outer face being at right angles to the axis of the tool and a screw carried by said member and bearing against the large end of the wedge to hold the same in adjusted position.

In testimony whereof, I hereunto affix my signature.

JAMES W. SMITH.